(12) United States Patent
Kinnunen

(10) Patent No.: US 7,031,318 B2
(45) Date of Patent: Apr. 18, 2006

(54) SELECTION OF A VIRTUAL PATH OR CHANNEL IN A COMMUNICATIONS NETWORK

(75) Inventor: Matti Kinnunen, Helsinki (FI)

(73) Assignee: Nokia Corporation, Espoo (FI)

( * ) Notice: Subject to any disclaimer, the term of this patent is extended or adjusted under 35 U.S.C. 154(b) by 1017 days.

(21) Appl. No.: 10/013,634

(22) Filed: Dec. 10, 2001

(65) Prior Publication Data
US 2002/0051456 A1    May 2, 2002

Related U.S. Application Data

(63) Continuation of application No. PCT/FI00/00344, filed on Apr. 20, 2000.

(30) Foreign Application Priority Data
Jun. 8, 1999 (FI) .................................. 991308

(51) Int. Cl.
   *H04L 12/28*    (2006.01)
(52) U.S. Cl. ................. 370/395.2; 370/395.4
(58) Field of Classification Search ............ 370/395.1, 370/395.2, 395.21, 395.4, 397
   See application file for complete search history.

(56) References Cited

U.S. PATENT DOCUMENTS

| | | | |
|---|---|---|---|
| 5,317,566 A | 5/1994 | Joshi | |
| 5,502,714 A * | 3/1996 | Sallberg | 370/351 |
| 5,867,497 A | 2/1999 | Fujimori et al. | |
| 5,896,371 A | 4/1999 | Kobayashi et al. | |
| 5,920,544 A * | 7/1999 | Watanabe | 370/232 |
| 6,292,466 B1 * | 9/2001 | Droz | 370/232 |
| 6,442,138 B1 * | 8/2002 | Yin et al. | 370/232 |

FOREIGN PATENT DOCUMENTS

| | | |
|---|---|---|
| EP | 0814632 | 12/1997 |
| EP | 0828400 | 3/1998 |
| WO | 97/48214 | 12/1997 |

* cited by examiner

*Primary Examiner*—Ricky Ngo
*Assistant Examiner*—Christine Ng
(74) *Attorney, Agent, or Firm*—Squire, Sanders & Dempsey LLP

(57) ABSTRACT

The invention relates to the selection of a virtual path or virtual channel in response to a connection request in a communications network. To achieve a fast selection of a valid virtual path, the available virtual paths are divided into three categories so that the first category (1) includes virtual paths that were accepted the last time they were tested, the second category (2) includes virtual paths that were rejected the last time they were tested, and the third category (3) includes the rest of the available virtual paths. A virtual path is moved from the second category to the third category according to a predetermined criterion. Virtual paths are tested in order so that first the virtual paths in the first category are tested, then the virtual paths in the third category, and finally the virtual paths in the second category. Virtual channels can be selected in the same way.

8 Claims, 3 Drawing Sheets

SELECTION OF A VIRTUAL PATH OR CHANNEL IN A COMMUNICATIONS NETWORK

This is a request for filing a continuation application under 37 C.F.R. §1.53(b) of prior pending international application number PCT/FI00/00344 filed on 20 Apr. 2000.

FIELD OF THE INVENTION

This invention relates to virtual path or virtual channel selection in communications networks, especially in ATM-based broadband networks. The selection is performed in a network element in response to receipt of a connection request.

BACKGROUND OF THE INVENTION

ATM (Asynchronous Transfer Mode) is a known connection-oriented packet-switching technique, which has been selected by the international organization for telecommunications standardization ITU-T as the target transfer mode solution for implementing a broadband multimedia network (B-ISDN). In these networks many traffic sources are bursty, whereby the transmission capacity required at some moment is high and the capacity required at another moment is low. Bursts may be described as a phenomenon whereby a set of cells (a burst) arrives at short intervals and the following set (burst) arrives after a relatively long time. Since different connections need different capacities and the need varies quickly, statistical multiplexing is used in an ATM-based network. The statistical characteristics of bursty traffic sources are utilized in statistical multiplexing: when a large set of traffic sources are combined, the combined traffic behaves in a more stable manner than the individual sources, and although the transmission speed of an individual traffic source varies, the combined transmission speed of mutually independent individual traffic sources is almost constant. By using statistical multiplexing, it is possible to serve more connections with the same resources, i.e. the utilization rate of the network can be increased.

In spite of statistical multiplexing, congestion and overload will still occur in the network, caused both by unpredictable statistical variations in the traffic and by failure situations occurring in the network. Since it is impossible to know with sufficient accuracy the services to be provided, the volume of traffic brought about by the services, and the exact characteristics of the traffic sources, the occurrence of congestion is unavoidable in a network. The purpose of traffic and congestion control is to protect the network and the user so that the desired quality of a service is achieved.

Traffic control is intended to prevent the occurrence of congestion situations, while congestion control reacts to congestion situations detected in the network. From the point of view of the quality of service (QoS), most significant are the traffic control functions which try to prevent congestion situations in advance, of which Connection Admission Control (CAC) is the most important preventive traffic control method. CAC is defined as the set of procedures taken by the network during the call (virtual connection) set-up phase, or during the call re-negotiation phase, to determine whether a connection request can be accepted or rejected. CAC accepts a connection only when sufficient resources are available at each successive link in the circuit, and when the new connection will not adversely affect the quality of service of existing connections.

Several different methods of implementing CAC are known. These methods are based either on traffic parameters stated by the user or on traffic measurements taking place in the network element. It is possible to estimate the quality of service or the capacity requirement which can be expected according to traffic parameters either with the aid of pre-computed tables as in methods termed "indirect" or by computing in real time based on traffic parameters informed in the connection request, as is done in methods termed "direct".

Various requirements, at least some of which are contradictory to one another, must be set for the CAC algorithms determining the acceptability of a connection request. A CAC algorithm should, for example, be as generic as possible in the sense of its applicability to the management of traffic sources of a wide number of different types. The algorithm must also be simple enough, for example, to be applied in real-time so that it will not form a bottle-neck restricting the call processing capacity of the switch. On the other hand, the algorithm should be very efficient in order to utilize the network resources optimally and to guarantee fair treatment of connections of different types.

ATM Forum has specified five different service categories which relate traffic characteristics and the quality of service (QoS) requirements to network behavior. These service classes are: constant bit rate (CBR), real-time variable bit rate (rt-VBR), non-real time variable bit rate (nrt-VBR), available bit rate (ABR), and unspecified bit rate (UBR). As each class represents connections which have essentially homogeneous traffic pattern characteristics and QoS requirements, it is easier to implement the CAC algorithm and to guarantee the QoS requirements of the existing connections if the capacities of links between two neighbouring network elements (switches) are divided into several virtual paths. For example, it would be very difficult to guarantee the QoS requirements of CBR traffic if UBR traffic shared the same logical queues with it. However, by dividing the available capacity between a plurality of virtual paths, each virtual path can accommodate the traffic of only one service class.

Thus, in practice there can be numerous (semi-permanent) virtual paths between two neighbouring network elements (the maximum number allowed is 64000). FIG. 1 illustrates this situation in an ATM network. The virtual paths between two neighbouring switches are shown as dashed lines.

Consequently, the network element includes means for choosing the virtual path from the set of alternative virtual paths heading to the desired destination. FIG. 2 is a functional block diagram illustrating one possible implementation of the virtual path selection in a switch. When a connection request arrives at the switch, a connection control block CC supplies the desired input data to the connection admission control and commands a selection block SB to select a candidate virtual path for the request. A connection request received includes typically at least the service class required and the traffic parameters describing the source, as shown in the figure. The selection block selects a virtual path and supplies the identifier of this virtual path to the connection admission control. The routing hierarchy is stored in the resources block RB and the selection block uses this hierarchy to determine the group of available virtual paths.

Using the input information the connection admission control then decides whether this virtual path can accommodate the connection requested. As a result, CAC returns a "yes" or "no" answer to the selection block. If CAC rejects the selected virtual path, the selection block selects a new candidate and supplies its identifier to CAC. In this way the selection block selects virtual paths until a virtual path is found that can accommodate the connection or until all the virtual paths have been tested and rejected. In the latter case, the connection request is rejected.

A straightforward selection method is to try each virtual path in consecutive order. In this method, however, the time required to find an acceptable virtual path may be rather lengthy. Thus, the problem in this kind of an environment is how to select a virtual path which CAC will accept with the minimum number of trials.

The same problem arises when a virtual channel is sought for connections (such as AAL2 connections) that can share one virtual channel (i.e. one ATM cell). In other words, free capacity can be searched for from entities on different hierarchical levels. In the following, the entities tested in order to find one with enough free capacity are called (logical) transmission resources. Thus, a (logical) transmission resource can in this context be a virtual path or a virtual channel.

SUMMARY OF THE INVENTION

The purpose of the invention is to find a solution to the above-mentioned problem and to bring about a method allowing the speedy selection of a logical transmission resource from among available transmission resources.

This goal can be attained by using the solution defined in the independent patent claims.

The basic idea of the invention is to divide the available logical transmission resources into three different categories. The first category includes all the resources that were accepted by CAC the last time they were tested, and the second category consists of the resources that were rejected by CAC the last time they were tested. Furthermore, resources are moved from the second category to a third category when a predetermined condition is true, preferably when a resource has been in the second category a predetermined length of time. Thus, the third category includes logical transmission resources which were rejected the last time they were tested but which have not been tested during the current traffic situation.

Each resource in the second category can be assigned an age value indicating the time the resource has spent without interruption in the second category. When this value exceeds a predetermined limit, the resource is moved to the third category. In a preferred embodiment of the invention, the age has an initial value that depends on the bandwidth demand in the rejected connection request: the greater the requested bandwidth, the greater the initial value. In this way the transmission resources which have moved to the second category because of a high bandwidth request will move more quickly to the third category. In this way the selection can be speeded up further.

BRIEF DESCRIPTION OF THE DRAWINGS

In the following, the invention and its preferred embodiments are described in closer detail with reference to examples in FIGS. 3 to 7 shown in the appended drawings, wherein.

DETAILED DESCRIPTION OF THE INVENTION

In the following the invention is described by using virtual paths as an example of the entities that are tested for finding an entity with enough free capacity to accommodate the connection.

Figure 1:
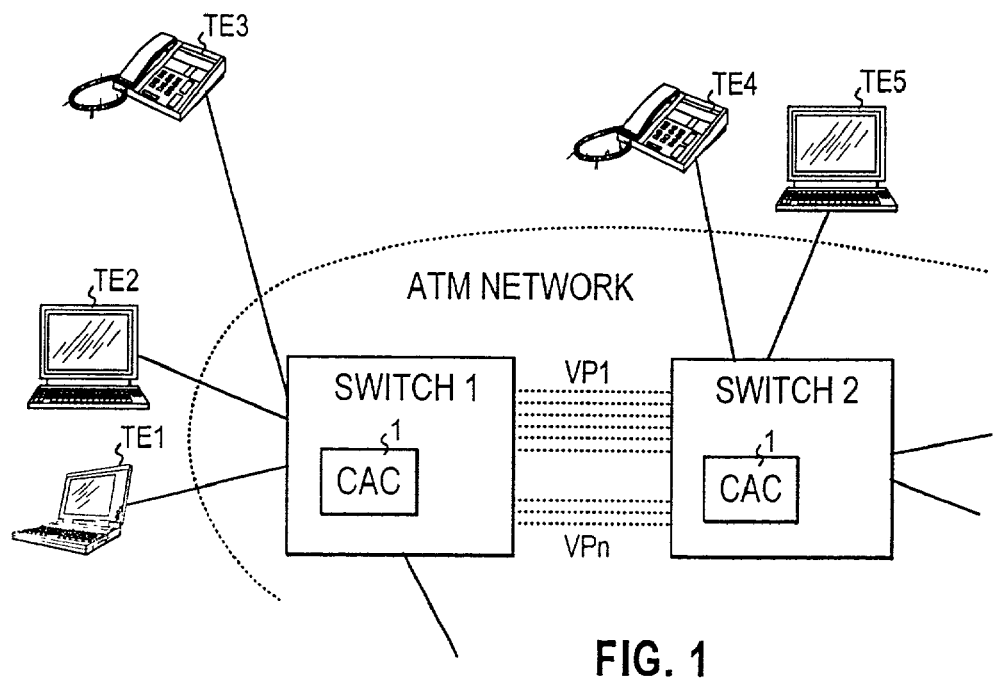
FIG. 1 is a block diagram of a network environment in which the method can be used.
Figure 2:
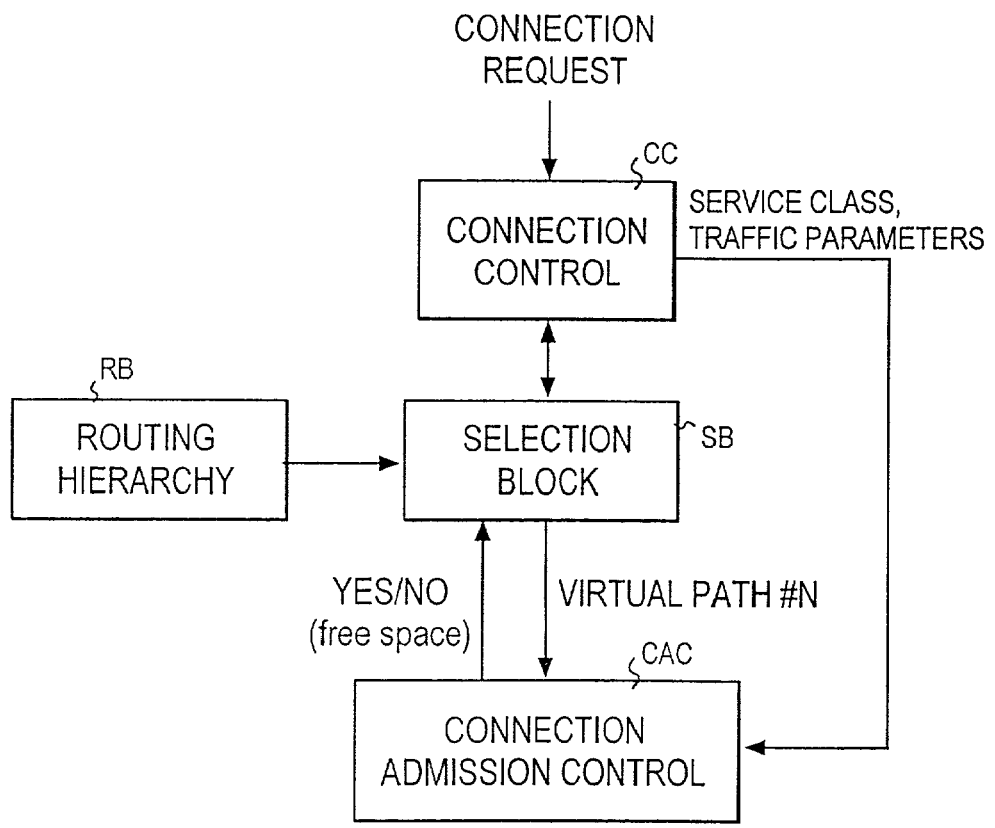
FIG. 2 illustrates the functional blocks carrying out the method in accordance with the invention in a switch.
Figure 3:
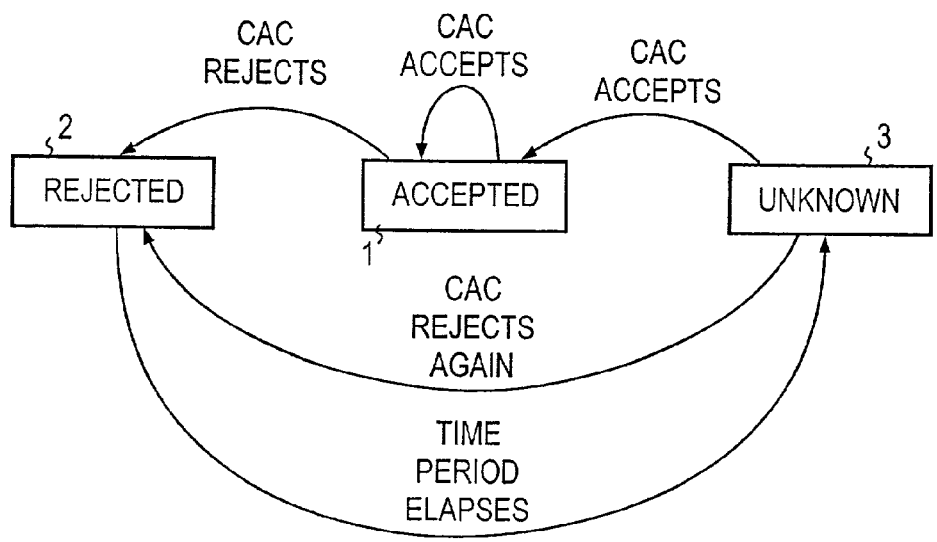
FIG. 3 is a state diagram illustrating the classification according to the present invention.

FIG. 3 is a state diagram illustrating the idea of the invention. The figure shows the three virtual path categories and the transitions between them.

According to the invention, the available virtual paths are classified under three different categories 1, 2 and 3. The first category (1) includes the virtual paths that have been accepted by CAC recently. In this category each virtual path was accepted the last time it was tested. The second category (2) includes the virtual paths that have been rejected by CAC recently. In this category each virtual path was rejected the last time it was tested. The third category (3) includes the rest of the virtual paths, i.e. the virtual paths which do not belong either to the first or to the second category.

As the system starts, all available virtual paths are in category 1. A virtual path remains in this category until CAC refuses to add a new connection to this virtual path. When CAC rejects the virtual path, the path is moved to category 2. The virtual path stays in this category for a predetermined period. When this period elapses, the virtual path is moved to category 3.

A virtual path in category 3 may have space for the new connection because one or more of the connections may have terminated during the time the virtual path was in category 2. On the other hand, there may be no free space at all for a new connection.

A virtual path can arrive at category 1 only from category 3. If a virtual path in category 3 is rejected, it is moved back to category 2.

Figure 4:
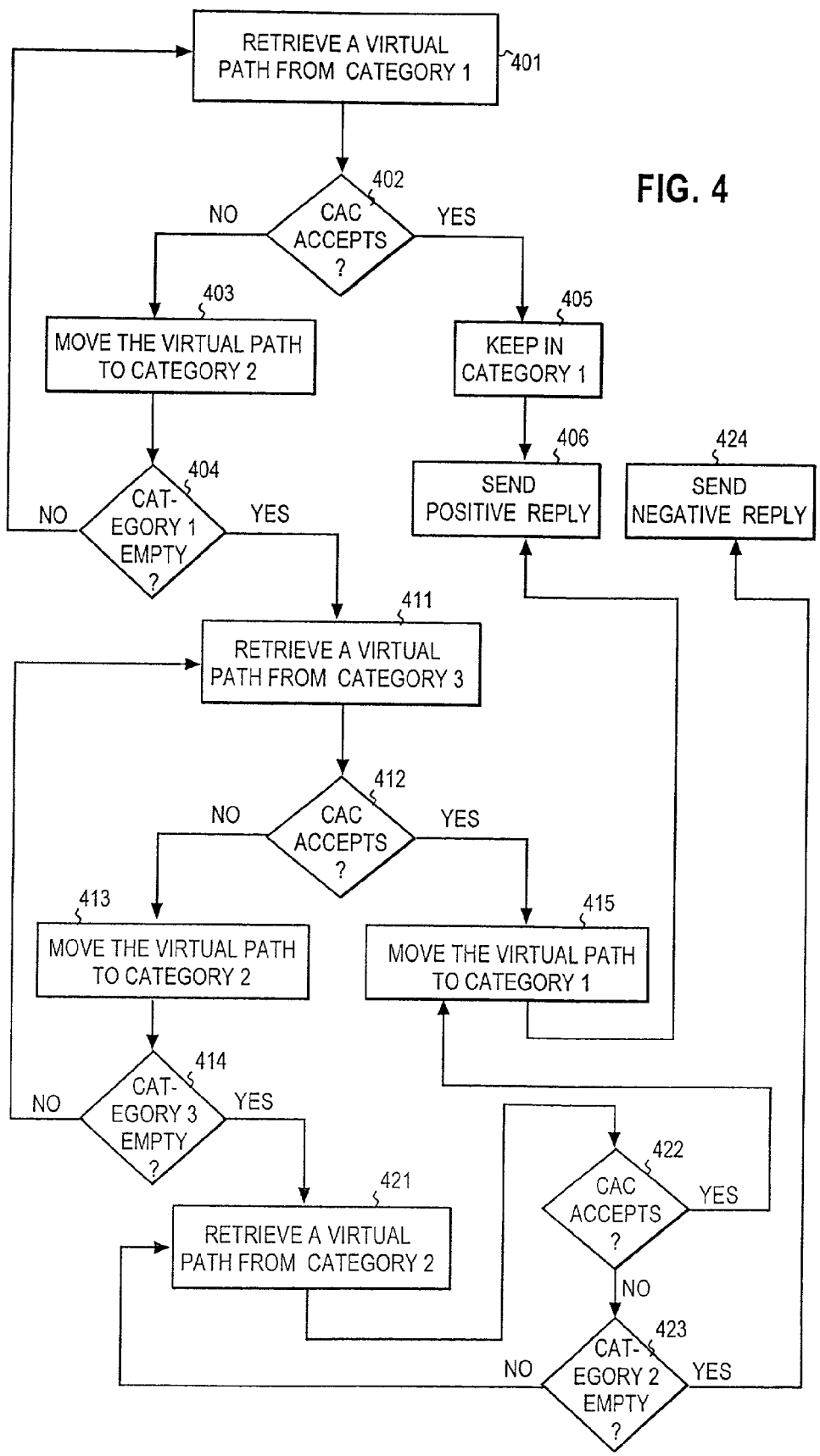

FIG. 4 is a flow diagram illustrating the selection process for one connection request. When a connection request arrives, the selection block begins to go through the virtual paths in category 1. Each virtual path that is rejected by CAC is moved to category 2 (step 403). If CAC accepts a virtual path belonging to category 1, this virtual path is kept in category 1 (step 405) and a reply (yes) is sent to the connection control (step 406).

If all the virtual paths in category 1 have been tested and rejected, the selection block begins to test the virtual paths in category 3 (step 411). Each virtual path rejected by CAC is moved to category 2 (step 413). If CAC accepts a virtual path belonging to category 3, this virtual path is moved to category 1 (step 415) and a reply (yes) is sent to the connection control (step 406).

If all the virtual paths in category 3 have been tested and rejected, the selection block begins to test the virtual paths in category 2 (step 421). If an acceptable virtual path is found in this category, the virtual path is moved to category 1 (step 415) and a reply (yes) is sent to the connection control (step 406). If all the virtual paths have been tested without finding an acceptable virtual path, a reply (no) is sent to the connection control (step 424).

Figure 5:
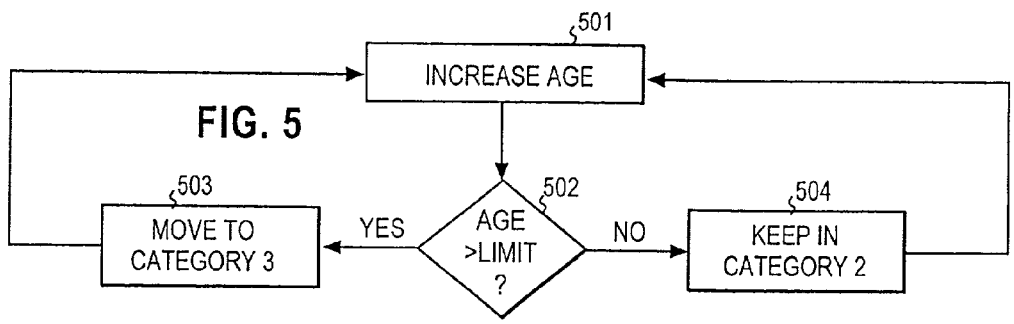
FIGS. 4 and 5 are flow diagrams illustrating the operation of the selection block according to the invention.

In addition to the operation shown in FIG. 4, the selection block continuously increases the age of the virtual paths in category 2. Thus, in addition to what is shown in FIG. 4, there is a separate process increasing the age of the virtual paths in category 2, as illustrated in FIG. 5. When the age of an individual virtual path exceeds a predetermined limit value, the virtual path is moved to category 3.

Figure 6:
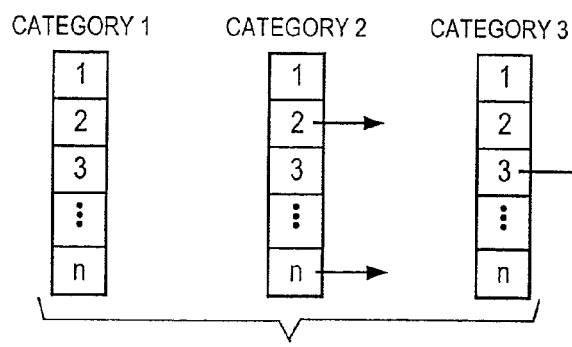
FIG. 6 shows one embodiment for implementing the classification of the logical channels.

There are several ways to implement the above-described operation. A simple way is to define three arrays of pointers to the virtual paths as shown in FIG. 6, and move pointers between these arrays as described above. The system for moving a pointer from category 2 to category 3 is based on timers. The number of elements in each array corresponds to the total number n of available virtual paths.

Figure 7:
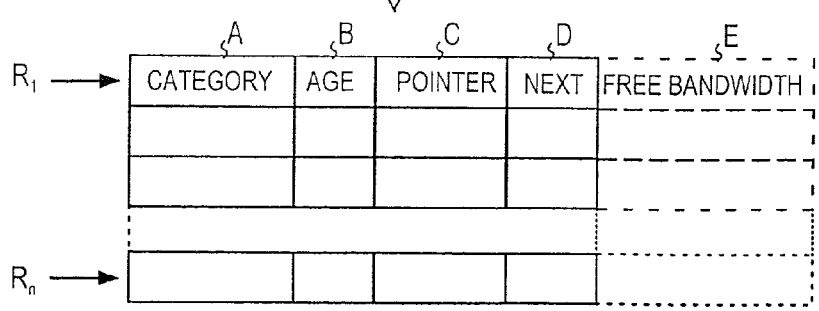
FIG. 7 shows another embodiment for implementing the classification.

A bit more sophisticated way is to define just one array of records, each record including, for example, four fields as shown in FIG. 7, in which the records have been denoted with reference mark $R_i$ (i=1 . . . n). The first field (A) in each record contains the category, i.e. 1, 2 or 3. The second field (B) contains an age attribute assigned to each virtual path in category 2 and indicating the time that the virtual path has been in category 2. In a preferred embodiment of the invention, the initial value of the age attribute depends on the bandwidth request in the rejected request: the greater the requested bandwidth, the greater the initial value. In this way the virtual paths which have moved to category 2 because of a high bandwidth request will move more quickly to category 3, as there may still be space in these virtual paths for several other connections with smaller bandwidth demands. The third field (C) of each record contains the pointer to the virtual path. The fourth field (D) gives the index of the next record in the same category in order to increase the speed with which the virtual paths in the same category are tested.

In a further preferred embodiment of the invention, CAC is implemented so that it also gives the selection block an estimate of the free bandwidth of each virtual path, so that the selection block can sort the records in decreasing order of available bandwidth. In this way the selection process tests out first those virtual paths which are more likely to become accepted. Thus in this embodiment the records have a field (E) indicating the available bandwidth.

The array can also be implemented by replacing the pointer fields with a field containing the identifiers of the virtual paths.

Although the invention has been described here in connection with the examples shown in the attached figures, it is clear that the invention is not limited to these examples, as it can be varied in several ways within the limits set by the attached patent claims. The following describes briefly some possible variations.

As mentioned above, the entities that the selection process tests in order to find one with enough free capacity can just as well be virtual channels. Further, the condition that must be met before a virtual path or a virtual channel can be moved from category 2 to category 3 can also vary. This condition need not relate to the time spent in category 2 but to changes in the current traffic situation. For example, if the rate of the requests exceeds a predetermined value or the number of resources in category 1 drops below another predetermined limit, one or more virtual channels or paths can be moved from category 2 to category 3. The transfer from category 2 to category 3 can also be based on the number of resources in those classes, for example, so that a virtual path or channel is transferred from category 2 to category 3 according to FIFO-principle when the number of virtual paths or channels in category 3 drops below a certain limit.

The invention claimed is:

1. A method of selecting a logical transmission resource for a connection in a communications network, the method comprising the steps of
    (a) receiving a request for a connection from a traffic source,
    (b) selecting a logical transmission resource from a group of available transmission resources,
    (c) testing whether the selected transmission resource has enough free capacity to accommodate the connection,
    (d) rejecting the selected transmission resource and jumping to phase (b) to select another transmission resource from said group when the selected transmission resource does not have enough free capacity to accommodate the connection,
    (e) accepting the selected transmission resource and assigning it to said connection when the transmission resource has enough free capacity to accommodate the connection,
    characterized by
        maintaining the available transmission resources in three categories so that the first category (1) includes resources that were accepted the last time they were tested, the second category (2) includes transmission resources that were rejected the last time they were tested, and the third category (3) includes transmission resources originating from the second category, whereby said maintaining includes moving transmission resources from the second category to the third category according to a predetermined criterion so that the third category includes transmission resources which were rejected the last time they were tested but which have not been tested during the current traffic situation, and
        testing the transmission resources in order so that first the resources in the first category are tested, then the resources in the third category, and finally the resources in the second category.

2. A method according to claim 1, characterized in that the resources are moved from the second category to the third category after they have spent a predetermined time period in the second category.

3. A method according to claim 2, characterized by
    assigning each transmission resource in the second category a first attribute,
    increasing the value of said first attribute proportionally to the time the resource has been without interruption in the second category, and
    moving the resource to the third category when the value exceeds a predetermined limit value.

4. A method according to claim 3, wherein a bandwidth demand is included in the request, characterized in that the attribute is given an initial value which is directly proportional to bandwidth demand in a rejected request.

5. A method according to claim 1, characterized by
    assigning each transmission resource a second attribute indicating the amount of free capacity in the transmission resource,
    sorting the transmission resources in each category in decreasing order of free capacity, and
    testing the transmission resources within each category in decreasing order of free capacity.

6. A method according to claim 1, characterized in that the transmission resource is a virtual path.

7. A method according to claim 1, characterized in that the transmission resource is a virtual channel.

8. A system for selecting a logical transmission resource for a connection in a network element adapted to receive a request for a connection from a traffic source, the system comprising selection means (SB) for selecting a logical transmission resource from a group of available transmission resources, and testing means (CAC) for testing whether the selected transmission resource has enough free capacity to accommodate the connection, characterized in that the system further includes classifying means for (a) maintaining the available transmission resources in three categories so that the first category (1) includes resources that were accepted the last time they were tested by the testing means, the second category (2) includes transmission resources that were rejected the last time they were tested by the testing means, and the third category (3) includes transmission resources originating from the second category, and for (b) moving transmission resources from the second category to the third category according to a predetermined criterion so that the third category includes transmission resources which were rejected the last time they were tested but which have not been tested during the current traffic situation, and the selection means are adapted to select the transmission resources in order so that first the resources in the first category are tested, then the resources in the third category, and finally the resources in the second category.

\* \* \* \* \*